United States Patent
Rodriguez Bravo et al.

(10) Patent No.: US 12,257,785 B2
(45) Date of Patent: Mar. 25, 2025

(54) BRAIDED MESH ROBOTIC SUPPORT FOR THREE-DIMENSIONAL (3D) PRINTS

(71) Applicant: Kyndryl, Inc., New York, NY (US)

(72) Inventors: Cesar Augusto Rodriguez Bravo, Alajuela (CR); Franz Friedrich Liebinger Portela, San Pablo de Heredia (CR); David Alonso Campos Batista, Aurora (CR); Sarbajit K. Rakshit, Kolkata (IN)

(73) Assignee: Kyndryl, Inc., New York, NY (US)

(*) Notice: Subject to any disclaimer, the term of this patent is extended or adjusted under 35 U.S.C. 154(b) by 484 days.

(21) Appl. No.: 17/587,393

(22) Filed: Jan. 28, 2022

(65) Prior Publication Data

US 2023/0241842 A1 Aug. 3, 2023

(51) Int. Cl.
*B29C 64/40* (2017.01)
*B29C 64/393* (2017.01)
*B33Y 10/00* (2015.01)
*B33Y 30/00* (2015.01)
*B33Y 50/02* (2015.01)

(52) U.S. Cl.
CPC ............ *B29C 64/40* (2017.08); *B29C 64/393* (2017.08); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS

| 5,893,092 A | 4/1999 | Driscoll |
| 9,688,024 B2 | 6/2017 | Stava |
| 10,226,895 B2 | 3/2019 | Schmidt |
| 10,434,717 B2 | 10/2019 | Boettcher et al. |

(Continued)

FOREIGN PATENT DOCUMENTS

| CN | 105904729 | 8/2016 |
| EP | 3026638 | 6/2016 |

(Continued)

OTHER PUBLICATIONS

Unknown, "Reusable scaffolding in 3D printing", IP.com, IPCOM000262466D, Jun. 3, 2020, 3 pages.

(Continued)

*Primary Examiner* — Bernard G Lindsay
(74) *Attorney, Agent, or Firm* — Erik Swanson; Andrew M. Calderon; Calderon Safran & Wright P.C.

(57) ABSTRACT

Aspects of the present disclosure relate generally to three-dimensional (3D) printing and, more particularly, to robotic support for 3D prints. For example, a computer-implemented method includes identifying, by the computing device, at least one structure in the 3D object source file requiring support for printing the at least one structure by a 3D printer; adding, by the computing device, to a 3D print file an instruction to request deployment of a support structure at a particular location to support the at least one structure by the 3D printer; and providing to the 3D printer, by the computing device, the 3D print file with the instruction to request deployment of the support structure at a particular location to support the at least one structure by the 3D printer.

19 Claims, 5 Drawing Sheets

(56) References Cited

U.S. PATENT DOCUMENTS

| | | | | |
|---|---|---|---|---|
| 2009/0255426 A1* | 10/2009 | Doyle | ............... | H05K 3/0008 |
| | | | | 29/428 |
| 2015/0066178 A1 | 3/2015 | Stava | | |
| 2015/0137423 A1 | 5/2015 | Ding | | |
| 2015/0151493 A1* | 6/2015 | Schmidt | ............... | B29C 64/40 |
| | | | | 700/98 |
| 2016/0067740 A1 | 3/2016 | Voris et al. | | |
| 2016/0067922 A1* | 3/2016 | Voris | ............... | B29C 64/393 |
| | | | | 425/150 |
| 2016/0144429 A1* | 5/2016 | Mizutani | ............... | B22F 12/90 |
| | | | | 425/78 |
| 2017/0304894 A1* | 10/2017 | Buller | ............... | B22F 12/45 |
| 2017/0348915 A1 | 12/2017 | Boettcher et al. | | |
| 2018/0214947 A1* | 8/2018 | Haro Gonzalez | ..... | B29C 64/153 |
| 2018/0257259 A1 | 9/2018 | Moharrer | | |
| 2018/0326660 A1 | 11/2018 | Gifford et al. | | |
| 2018/0373227 A1 | 12/2018 | Sadusk et al. | | |
| 2020/0275992 A1* | 9/2020 | Shannon | ............... | A61C 19/02 |
| 2020/0307068 A1* | 10/2020 | Huang | ............... | B33Y 10/00 |
| 2021/0283856 A1* | 9/2021 | Chen | ............... | B29C 64/124 |

FOREIGN PATENT DOCUMENTS

| | | |
|---|---|---|
| JP | 2015098165 | 5/2015 |
| JP | 2018129031 | 8/2018 |
| WO | 2018223043 | 12/2018 |

OTHER PUBLICATIONS

Adrian Bowyer, "The Electric 3D Printer", https://reprapltd.com/documentation/the-electric-3d-printer/, downloaded Jan. 21, 2022, 13 pages.

Hironori Kondo, "3D Printing Overhang: How to 3D Print Overhangs", https://all3dp.com/2/3d-printing-overhang-how-to-master-overhangs-exceeding-45/, downloaded Oct. 19, 2021, 17 pages.

Mell et al., "The NIST Definition of Cloud Computing", NIST, Special Publication 800-145, Sep. 2011, 7 pages.

Pearson, "New Fabric Could Turn All Our Clothes Into Robots", Motherboard Tech by Vice, www.vice.com, https://www.vice.com/en/article/z4mq3j/new-fabric-could-turn-all-our-clothes-into-robots, accessed Jan. 28, 2022, 4 pages.

Venere et al., "Robotic fabric could bring 'active clothing,' wearable robots", Purdue University, https://www.purdue.edu/newsroom/releases/2014/Q3/robotic-fabric-could-bring-active-clothing,-wearable-robots.html, Sep. 23, 2014, 3 pages.

Berger, "Embedded 3D printing for soft robotics fabrication", Nanowerk, https://www.nanowerk.com/spotlight/spotid=36180.php, Posted Jun. 24, 2014, 5 pages.

Unknown, "Active clothing for soft robots", Kurzweil.net, https://www.kurzweilai.net/robotic-fabric-could-bring-active-clothing-wearable-robots, Sep. 26, 2014, 3 pages.

* cited by examiner

BRAIDED MESH ROBOTIC SUPPORT FOR THREE-DIMENSIONAL (3D) PRINTS

BACKGROUND

Aspects of the present invention relate generally to three-dimensional (3D) printing and, more particularly, to robotic support for 3D prints.

3D printers generally require support structures to print 3D objects with structures that are at certain angles, have certain unsupported lengths, etc. More specifically, in printing a 3D object, a 3D printer deposits layer upon layer of thermoplastics to create the 3D object. Each new layer is supported by the layer beneath it, but, where there are angles greater than 45 degrees in the 3D model, an overhang structure will occur without a sufficient layer beneath it. In this and other situations, the printed object requires some support so that the printed object does not collapse.

In practice, vertical supports are used underneath the unsupported structures of the 3D print for a successful print. For example, a 3D printer may print a support structure on the printing bed of the printer underneath structures to buttress unsupported structures of the printed 3D print. Once printed, the support structures are removed from the 3D print. In alternative methods, the 3D model may be reconstructed to replace unsupported structures by adding a base structure to the 3D model to anchor unsupported structures of the 3D print.

SUMMARY

In a first aspect of the invention, there is a computer-implemented method including: identifying, by the computing device, at least one structure in the 3D object source file requiring support for printing the at least one structure by a 3D printer; adding, by the computing device, to a 3D print file an instruction to request deployment of a support structure at a particular location to support the at least one structure by the 3D printer; and providing to the 3D printer, by the computing device, the 3D print file with the instruction to request deployment of the support structure at a particular location to support the at least one structure by the 3D printer.

In another aspect of the invention, there is a computer program product including one or more computer readable storage media having program instructions collectively stored on the one or more computer readable storage media. The program instructions are executable to: send, by a 3D printer, a request to a controller device to deploy a robotic support fabric at a location to support printing of the at least one structure of a 3D object by the 3D printer; scan with at least one sensor, by the 3D printer, the location to support the printing the at least one structure of the 3D object by the 3D printer to verify deployment of the robotic support fabric; and print, by the 3D printer, the 3D object by over the robotic support structure.

In another aspect of the invention, there is a system including a 3D printer having a central processor, at least one computer readable storage medium, and executable instructions stored on the at least one computer readable storage medium; a printer bed operably coupled to the 3D printer to support printing of a 3D print; a sensor operably coupled to the 3D printer to scan a location of a 3D print on the printer bed; a support control device operably coupled to the 3D printer to deploy support at a location of the 3D print on the printer bed; and a robotic support fabric operably coupled to the support control device and operably coupled to the 3D bed to provide support at the location of the 3D print on the printer bed.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to 3D printing and, more particularly, to a robotic support structure for 3D prints. According to aspects of the invention, a printing bed of a 3D printer includes a robotic support structure which is adaptable to support different 3D prints, e.g., 3D objects printed by the 3D printer. According to further aspects, the 3D printer may include a system or computer program product, e.g., a 3D printer server, that identifies structures in a 3D object source file requiring support for printing the structures by the 3D printer and determines an area to support the 3D printed structures.

Implementations of the invention may identify structures in the 3D object source file requiring support for printing, for instance, that form an overhang in the 3D object source file with an angle greater than a threshold, or that form a bridge in the 3D object source file with a length greater than a threshold, among other structures requiring support during the printing process. In embodiments, the system or computer program product adds an instruction to a 3D print file of the 3D object to request deployment of the robotic support structure from the printer bed and a specification of the area to support for printing the structures by the 3D printer. Implementations of the invention send the 3D print file with the instruction to request deployment of support and the area requiring support for printing to the 3D printer.

In embodiments, the 3D printer receives the instruction in the 3D print file to request deployment of the support structure and sends a request to a controller device to deploy the robotic support structure, e.g., support fabric, that is part of a print bed of the 3D printer. The request includes an area to support for the 3D print. In implementations of the invention, the 3D printer may also include sensors to scan the area in need of support to verify deployment of the robotic support and resume printing the 3D print.

Aspects of the present invention are directed to improvements in computer-related technology. In embodiments, the system including a processor, a computer readable memory, one or more computer readable storage media, and program instructions collectively stored on the one or more computer readable storage media may identify in a 3D object source file structures of the 3D object requiring support for printing by a 3D printer, add to a 3D print file of the 3D object an instruction to request deployment of support and a specification of the area to support for printing of the 3D object by the 3D printer. The program instructions send the 3D print file to the 3D printer.

Additional aspects of implementations of the invention make further non-abstract improvements to computer technology. For instance, a 3D printer having a central processor, at least one computer readable storage medium, and executable instructions stored on the at least one computer readable storage medium, may send a request to a controller device to deploy a robotic support fabric with the specification of the area to support for printing the 3D print, scan with a sensor the area in need of support to verify deployment of the robotic support fabric, and resume printing the 3D print, among other substantial, non-trivial technological improvements. Implementations of the invention describe additional elements that are specific improvements in the way computers may operate and these additional elements provide non-abstract improvements to computer functionality and capabilities.

It should be understood that, to the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
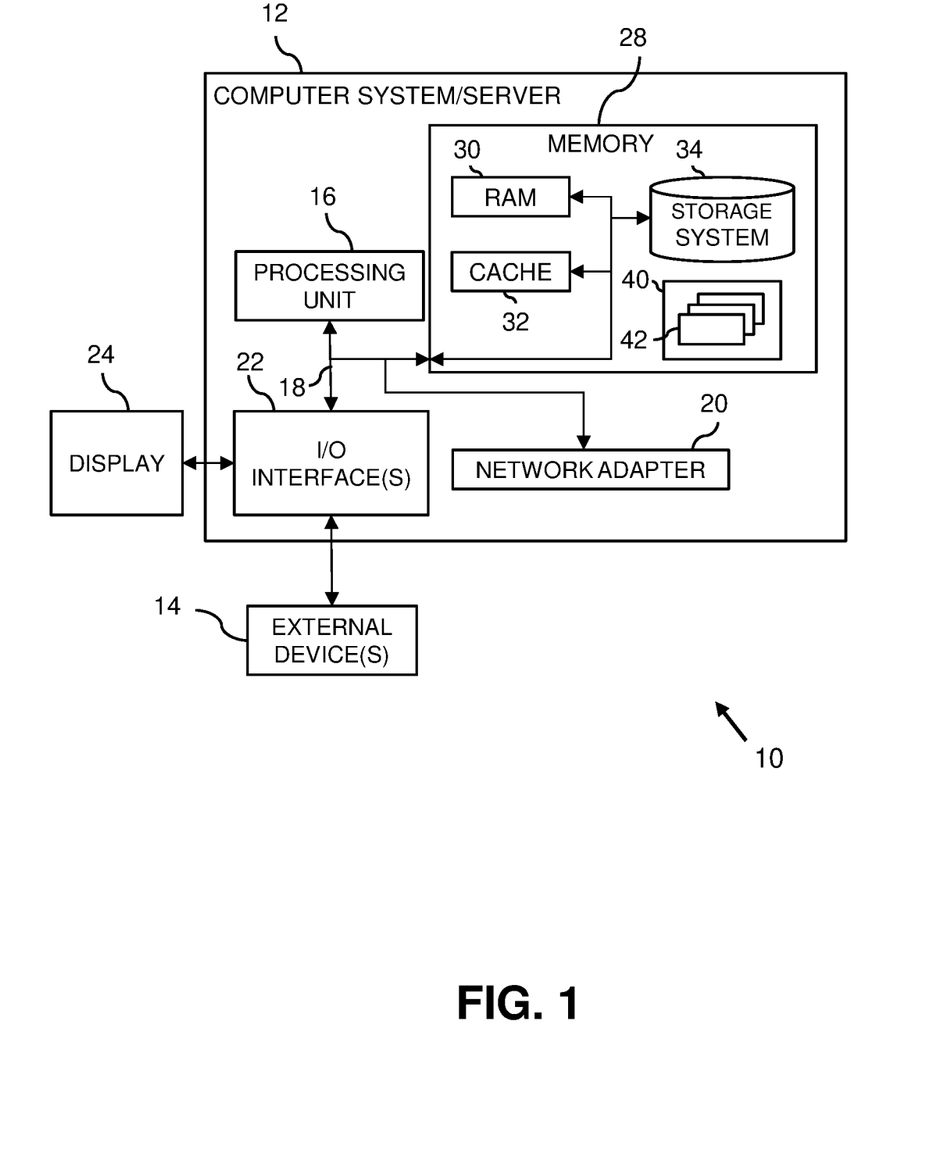
FIG. 1 depicts a computer infrastructure according to an embodiment of the present invention.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
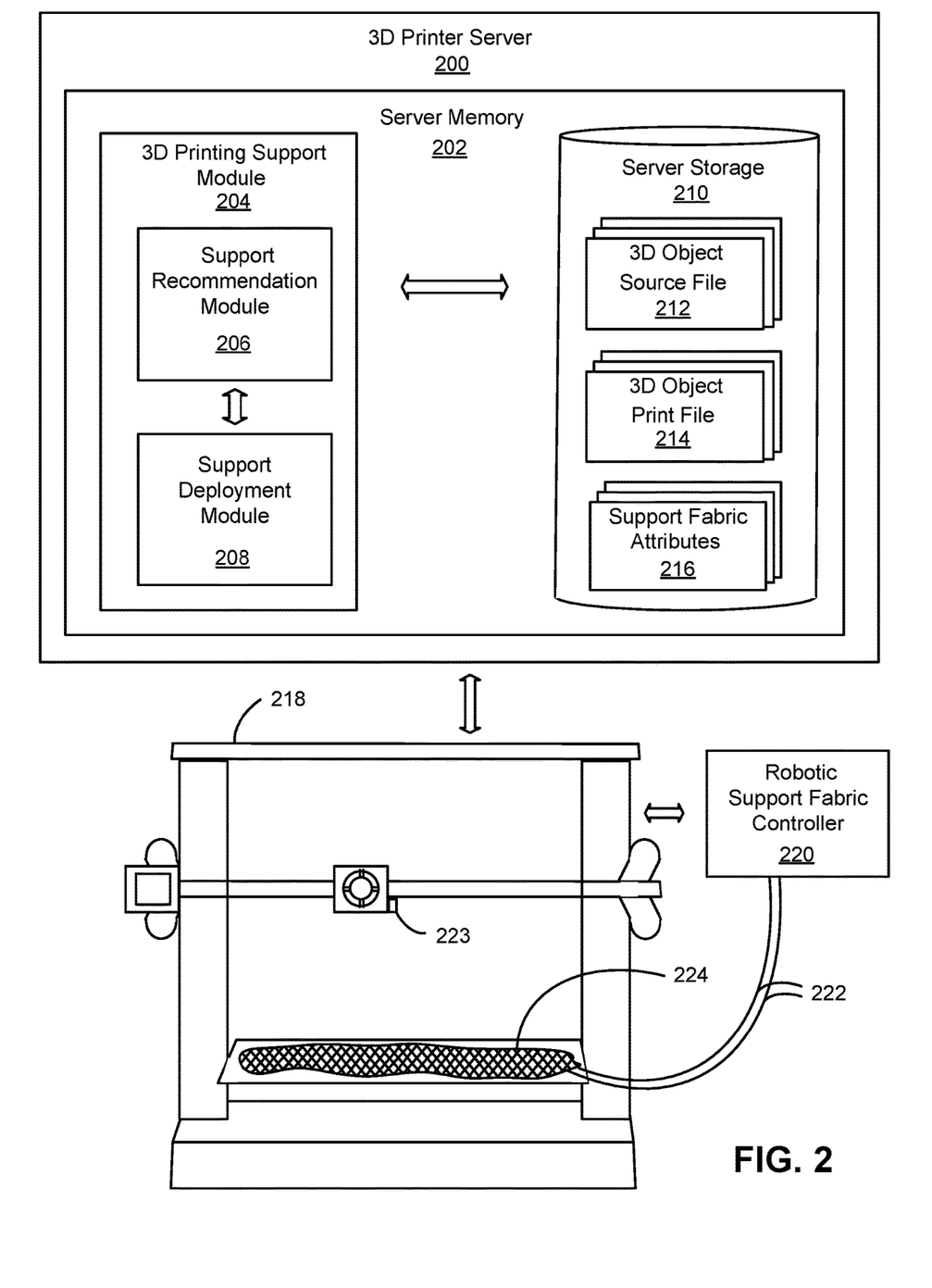
FIG. 2 shows a block diagram of an exemplary environment in accordance with aspects of the invention.

FIG. 2 shows a block diagram of an exemplary environment in accordance with aspects of the invention. In embodiments, the environment includes a 3D printer server 200, which may be a computer system such as computer system 12 described with respect to FIG. 1, and a server memory 202 such as memory 28 described with respect to FIG. 1. In general, the 3D printer server 200 provides services required for deploying the robotic support for 3D prints of 3D objects with unsupported structures. The 3D printer server 200 includes, in memory 202, a support recommendation module 206 having functionality to identify structures in a 3D object source file requiring support for printing the structures by a 3D printer and determine an area in need of support for a 3D print of the 3D object. The 3D printer server 200 also includes, in memory 202, a support deployment module 208 having functionality to add instructions to a 3D print file of the 3D object to request deployment of support for the 3D print with a specification of the area in need of support for the 3D print.

In embodiments, the support recommendation module 206 and a support deployment module 208, may each comprise one or more program modules such as program modules 42 described with respect to FIG. 1. The 3D printer server 200 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In accordance with aspects of the invention, the 3D printer server 200 also includes, in memory 202, server storage 210 which may be computer storage such as system storage 34 described with respect to FIG. 1. In embodiments, server storage 210 stores information for 3D models in a 3D object source file 212, information for printing a 3D model from a 3D object source file in a 3D object print file 214, and information of support fabric attributes in a support fabric attributes file 216. The support fabric attributes may include, e.g., type of material, types of filament compatible with low adherence, temperature range, etc. Each of these files and modules may be used to assess structures requiring support for a 3D print and instruct the 3D printer to provide robotic support as required during printing.

In accordance with aspects of the invention, the 3D printer server 200 is operably coupled to a 3D printer 218 and communicates with the 3D printer 218, for instance, to send a 3D print file to the 3D printer 218 for printing a 3D object. In embodiments, the 3D printer server 200 may communicate with the 3D printer 218 via input/output (I/O) interfaces such as Input/Output (I/O) interfaces 22 described with respect to FIG. 1 that enable computer system 12 to communicate with one or more other computing devices. Still yet, the 3D printer server 200 may communicate with the 3D printer 218 via one or more networks such as a local area network (LAN), a general wide area network (WAN), and/or a public network (e.g., the Internet) via a network adapter such as network adapter 20 described with respect to FIG. 1 that enable computer system 12 to communicate with one or more other computing devices.

In embodiments, the 3D printer 218 may include components of a general-purpose computing device, such as computer system 12 described with respect to FIG. 1, with one or more processors or processing units 16, a system memory 28, computer system readable media, and one or more program modules such as program modules 42, each described with respect to FIG. 1. The 3D printer 218 additionally includes, in embodiments, one or more sensors 223 having functionality to scan the area of the printing bed of the 3D printer 218 upon which the 3D print is fabricated. In embodiments, the 3D printer 218 may have one or more sensors 223 located near the tip of the print head of the 3D printer 218 as shown and/or located on either side of the printing bed. Implementations of the invention may also include a sensor array having functionality to scan the 3D print on the printing bed 218 of the 3D printer 218.

In accordance with aspects of the invention, the 3D printer 218 is also operably coupled to and communicates with a robotic support fabric controller 220, for example, to send a request to the robotic support fabric controller 220 to deploy a robotic support structure 224, e.g., support fabric, with a specification of the area to support for printing the 3D print. In embodiments, the 3D printer 218 may communicate with the robotic support fabric controller 220 via input/output (I/O) interfaces such as Input/Output (I/O) interfaces 22 described with respect to FIG. 1 that enable computer system 12 to communicate with one or more other computing devices. Alternatively, the 3D printer 218 may communicate with the robotic support fabric controller 220 via one or more networks such as a local area network (LAN), a general wide area network (WAN), and/or a public network (e.g., the Internet) via a network adapter such as network adapter 20 described with respect to FIG. 1 that enable computer system 12 to communicate with one or more other computing devices. Furthermore, the robotic support fabric controller 220 is operably coupled by interface wires 222 to the robotic support fabric 224 and communicates with the robotic support fabric 224, for example, by sending signals such as electrical current to shape the robotic support fabric 224 to conform to an area or desired shape for support of a structure being printed.

In embodiments, the robotic support fabric 224 may change size and structure based on the electrical current applied. For example, the robotic support fabric 224 can be a flexible braided mesh fabric made of polyetherimide (PEI) fibers. Actuating fibers are integrated into the PEI fabric in meshes to generate contracting motion. And actuating fibers are integrated into the PEI fabric in linear stripe patterns to generate bending motion and, furthermore, can be paired with actuating fibers integrated on the opposite side of the PEI fabric to generate an opposite bending motion. The actuating fibers can be made of a shape-memory alloy (SMA) wire, such as nickel titanium (NiTi), which is electrically conductive and activates with heat to configure to a programmed shape, for example, by contracting or bending. To raise an area of the robotic fabric on the printer bed to a specific height, for example, current can be applied to the appropriate linear stripe pattern of actuating fibers integrated into the fabric to bend the fabric up to the height specified for that area.

In accordance with aspects of the invention, information of support fabric attributes in a support fabric attributes file 216 may indicate the material of the robotic support fabric 224 and information of the types of filament with low adherence to the robotic support fabric 224. In embodiments, the system may display the types of filament with low adherence to the robotic support fabric 224. The system may include the functionality to display a warning message to a user, if the user wants to use a filament that may adhere to the material of the robotic support fabric 224. The system may also display a message to the user that may provide options of compatible materials with the robotic support fabric 224 and may display a message requesting the user to manually remove the robotic support fabric 224 from 3D printed part and redeploy the robotic support fabric.

Figure 3A:
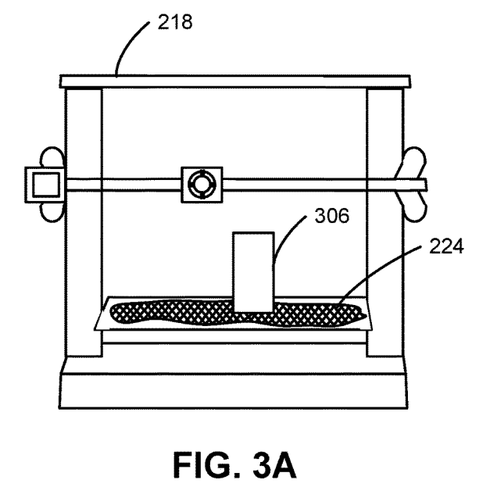
FIGS. 3A-3D show exemplary scenarios for robotic support for a 3D print in accordance with aspects of the invention.
Figure 3B:
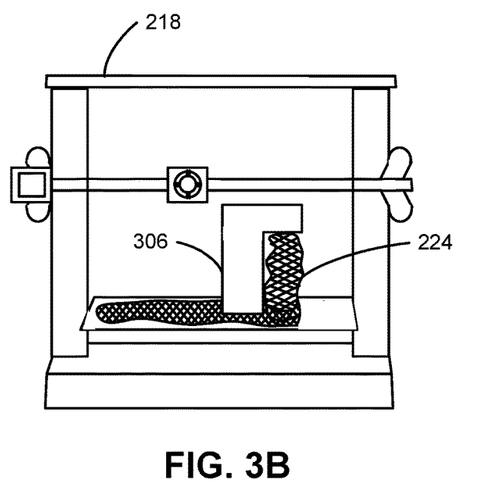
Figure 3C:
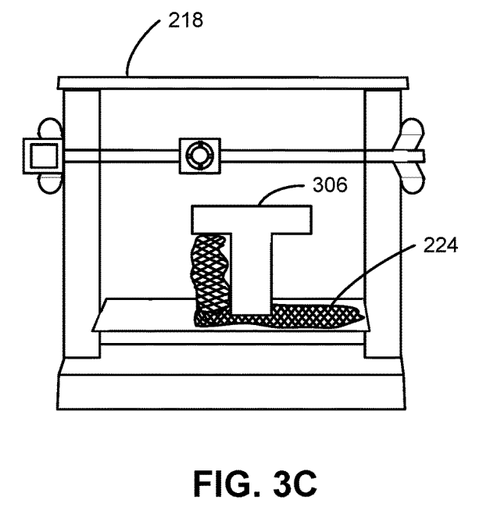

FIGS. 3A-3D show exemplary scenarios for deployment of the robotic support fabric for a 3D print. For example, FIG. 3A illustrates a 3D printer 218 with a robotic support fabric 224 on the printing bed of the 3D printer. Also on the print bed is a vertical beam, e.g., 3D print 306, in the process of being printing by the 3D printer 218. So far in the fabrication of the 3D object, the vertical beam does not require support by the robotic support fabric on the printing bed of the 3D printer. As shown in FIG. 3B, to continue printing the horizontal beam on top of the vertical beam, support is needed to avoid extruding filament into the air. Analysis of the 3D model specified in a 3D model source file would reveal that the right and left sides of the horizontal beam each form an angle greater than 45 degrees with the vertical beam, and consequently each of the sides of the horizontal beam represent an overhang structure requiring support. Accordingly, as shown in FIGS. 3B and 3C, robotic support fabric 224 is deployed to support the area under the horizontal beam.

As shown in FIGS. 3B and 3C, the robotic support fabric 224 has changed its size and shape to support printing of the right side of the horizontal beam on top of the previously fabricated vertical beam of the 3D print 306 illustrated in FIG. 3A. In embodiments of the present invention, the 3D printer may receive a specification of the area requiring support from the 3D print file and send the specification of the area requiring support to the robotic support fabric controller to deploy the robotic support fabric to support the specified area under the right side of the horizontal beam. Upon verifying the robotic support fabric 224 is deployed in the specified area, the 3D printer continues to fabricate the right side of the horizontal beam.

Figure 3D:
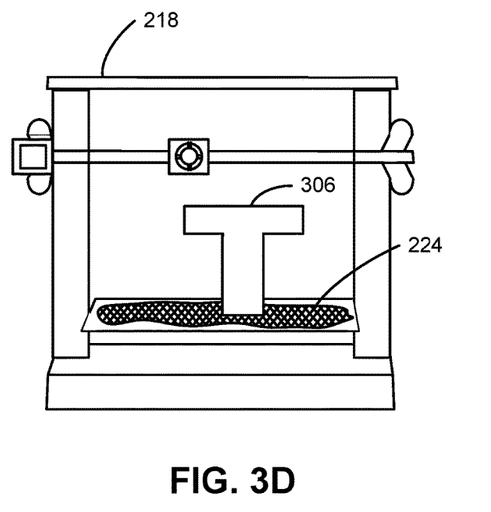

Upon verifying the robotic support fabric is properly deployed in the specified area in embodiments, the 3D printer 218 prints both the right side and the left side of the horizontal beams. For example, FIG. 3C illustrates, in the example, the redeployment of the robotic support fabric 224 by changing its size and shape to provide support for printing of the left side of the horizontal beam of the 3D print 306 on the 3D printer 218. And FIG. 3D illustrates, in the example, the 3D print 306 of the fabricated horizontal beam on top of a vertical beam on the 3D printer 218 with the robotic support fabric 224 undeployed.

Figure 4:
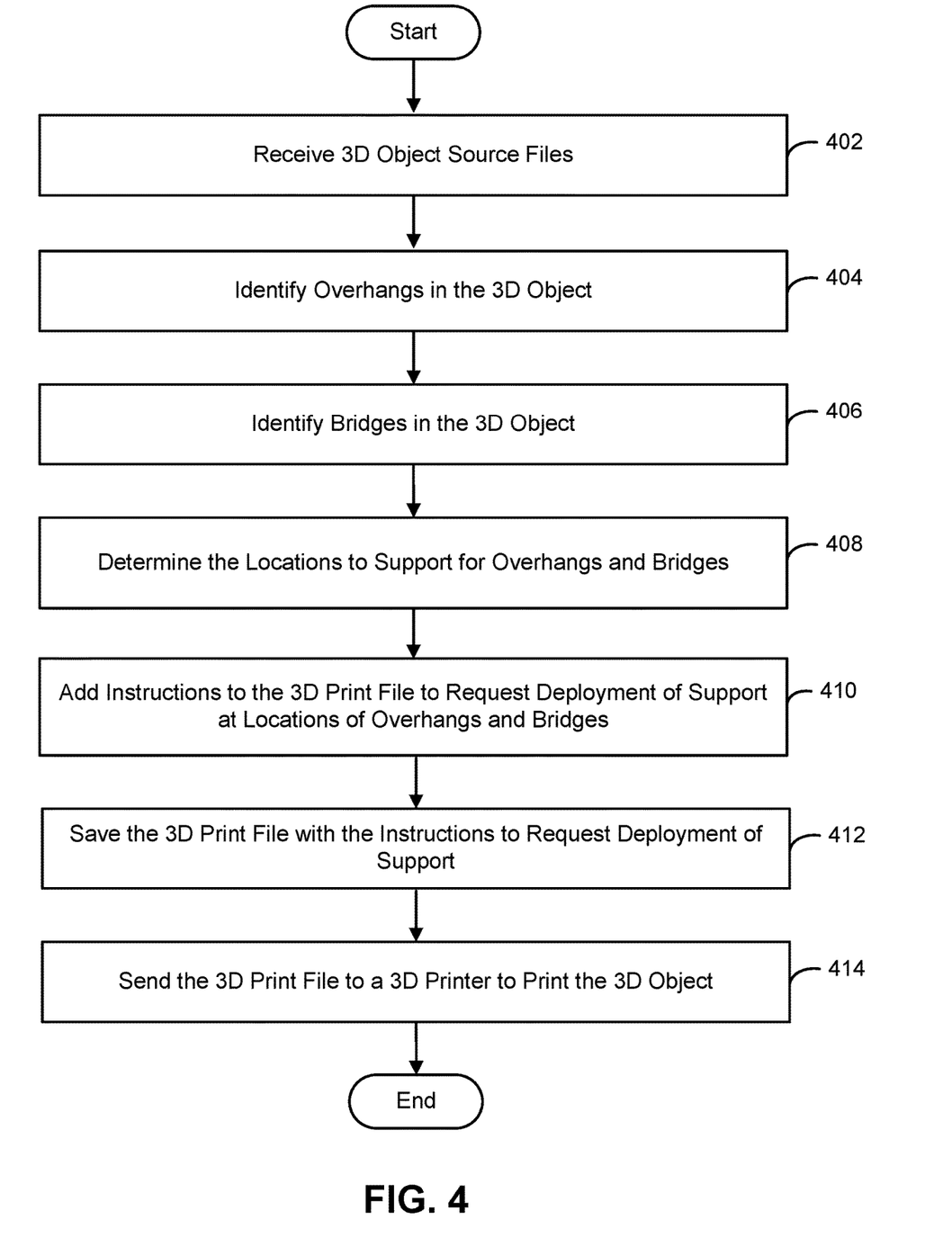
FIG. 4 shows a flowchart of an exemplary method in accordance with aspects of the invention.
Figure 5:
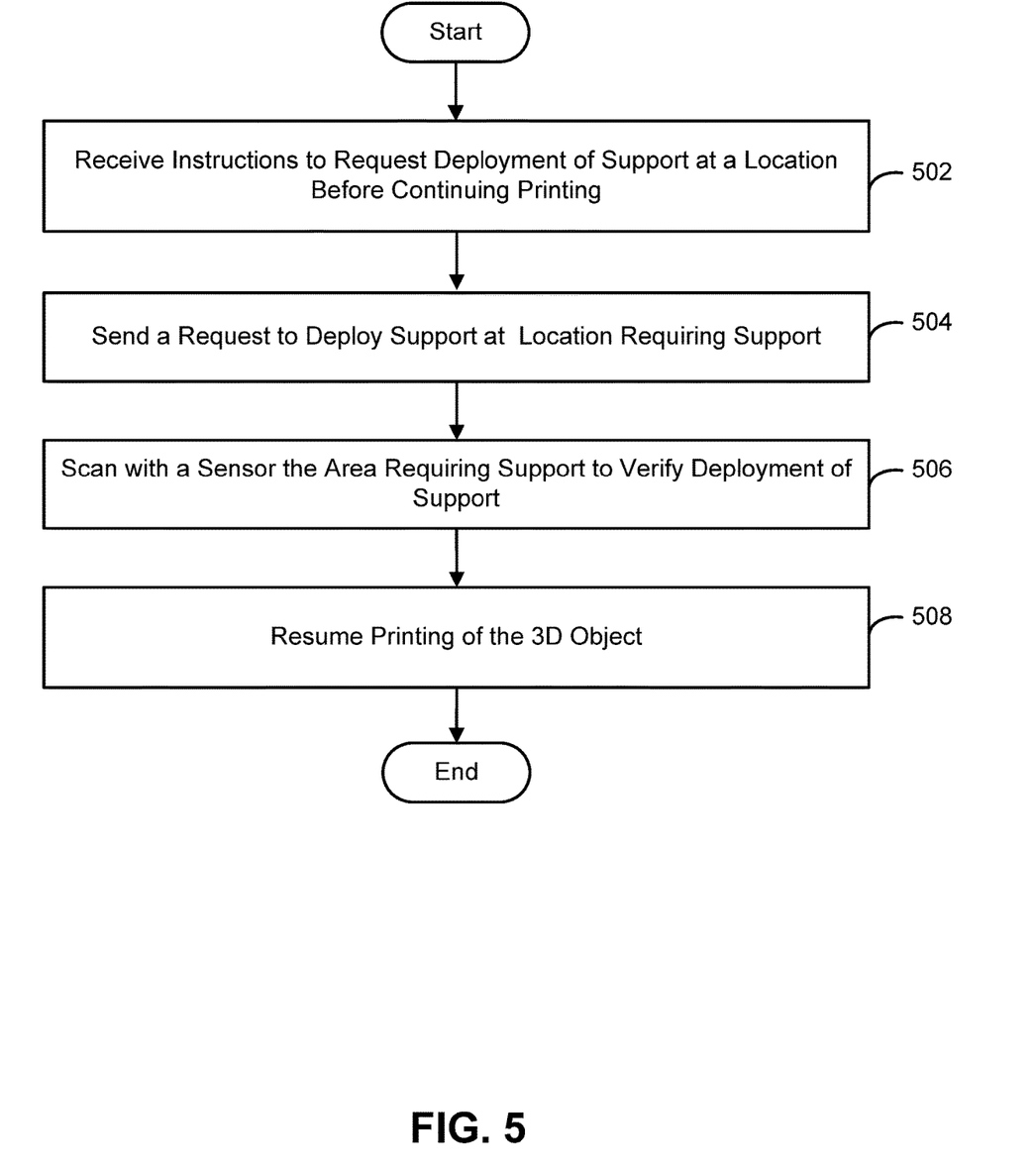
FIG. 5 shows a flowchart of an exemplary method in accordance with aspects of the invention.

FIGS. 4 and 5 show flowcharts and/or block diagrams that illustrate the architecture, functionality, and operation of possible implementations of systems, methods, and computer program products according to various embodiments of the present invention. As noted above, each block may represent a module, segment, or portion of instructions, which comprises one or more executable instructions for implementing the specified logical function(s). The functions noted in the blocks may occur out of the order, two blocks shown in succession may, in fact, be accomplished as one step, executed concurrently, substantially concurrently, in a partially or wholly temporally overlapping manner, or the blocks may sometimes be executed in the reverse order, depending upon the functionality involved.

FIG. 4 shows a flowchart of an exemplary method in accordance with aspects of the present invention. Steps of the method may be carried out in the environment of FIG. 2 and are described with reference to elements depicted in FIG. 2.

At step 402, the system may receive a 3D object source files specifying a 3D object. In an embodiment, the 3D printer server 200 as shown in FIG. 2 may receive a 3D object source file 212 specifying a 3D model.

At step 404, the system may identify overhangs in the 3D object. For example, an overhang exists where there is an angle formed between contiguous sides of structures in the 3D object with an angle greater than a threshold. In an embodiment, the support recommendation module 206 as shown in FIG. 2 may identify overhangs in the 3D object with an angle greater than a threshold. In an implementation of the invention, the threshold may be 45 degrees; although other angles are contemplated herein.

At step 406, the system may identify bridges in the 3D object with a length greater than a threshold. In an embodiment, the support recommendation module 206 as shown in FIG. 2 may identify bridging distances between two structures in the 3D object with a length greater than a threshold. In an implementation of the invention, the threshold may be a length of 50 millimeters; although other lengths are contemplated herein.

At step 408, the system may determine the area to support for each overhang with an angle greater than the threshold and each bridge with a length greater than a threshold. In an embodiment, the support recommendation module 206 as shown in FIG. 2 may determine the area to support for each overhang with an angle greater than the threshold and each bridge with a length greater than a threshold.

At step 410, the system may add instructions to the 3D print file to request deployment of support at locations with overhangs and bridges. In embodiments, the support deployment module 208 as shown in FIG. 2 may add instructions to the 3D object print file 214 of the 3D object to request deployment of support for the 3D print with a specification of the area to support for each overhang with an angle greater than the threshold and each bridge with a length greater than a threshold.

At step 412, the system may save the 3D print file with the instructions to request deployment of support for the 3D print and with a specification of the areas in need of support for the 3D print. In embodiments, the support deployment module 208 as shown in FIG. 2 may save in server storage 210 the 3D object print file 214 with the instructions to request deployment of support for the 3D print and with a specification of the areas in need of support for the 3D print.

At step 414, the system may send the 3D print file with the instructions to request deployment of support for the 3D print and with a specification of the areas in need of support for the 3D print to a 3D printer to print the 3D object. In embodiments, the 3D printer server 200 as shown in FIG. 2 may send a 3D object print file 214 with the instructions to request deployment of support for the 3D print and with a specification of the areas in need of support for the 3D print to 3D printer 218 to print the 3D object.

FIG. 5 shows a flowchart of an exemplary method in accordance with aspects of the present invention. Steps of the method may be carried out in the environment of FIG. 2 and are described with reference to elements depicted in FIG. 2.

At step 502, the system may receive instructions to request deployment of support for a 3D print at locations requiring support before continuing printing of a 3D object. In embodiments, the 3D printer 218 as shown in FIG. 2 may receive instructions in a 3D print file to request deployment of support for a 3D print with a specification of the area requiring support before continuing printing of a 3D object.

At step 504, the system may send a request to deploy support for a 3D print at a location requiring support. In embodiments, the 3D printer 218 as shown in FIG. 2 may send a request to the robotic support fabric controller 220 to deploy support for a 3D print with the specification of the area requiring support.

At step 506, the system may scan with a sensor the area requiring support to verify deployment of support. In embodiments, the 3D printer 218 as shown in FIG. 2 may scan with a sensor 223 the fabrication of the 3D print on the printing bed of the 3D printer 218 to verify deployment of the robotic support fabric in the area requiring support.

At step 508, the system may resume printing of the 3D object. In embodiments, the 3D printer 218 as shown in FIG. 2 may resume printing of the 3D object.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
identifying, by a computing device, at least one structure in a three-dimensional (3D) object source file requiring support for printing the at least one structure by a 3D printer;
adding, by the computing device, to a 3D print file an instruction to request deployment of a support structure at a location to support the at least one structure by the 3D printer;
providing to the 3D printer, by the computing device, the 3D print file with the instruction to request deployment of the support structure at the location to support the at least one structure by the 3D printer; and
deploying the support structure at the location, wherein the support structure comprises a flexible braided mesh fabric, wherein the flexible braided mesh fabric changes size and shape based on an applied electrical current.

2. The method of claim 1, wherein the identifying comprises identifying at least one overhang in the at least one structure comprising an angle greater than a threshold and wherein the angle is 45 degrees or greater.

3. The method of claim 1, wherein the flexible braided mesh fabric comprises actuating fibers configured to generate contracting and bending motions.

4. The method of claim 1, wherein the identifying comprises identifying at least one bridge in at least one structure comprising a length greater than a threshold.

5. The method of claim 1, further comprising: providing, by the 3D printer, a request to a controller device to deploy the support structure at the location to support the at least one structure.

6. The method of claim 1, further comprising: scanning, by the 3D printer, the location to verify deployment of the support structure.

7. The method of claim 5, further comprising providing an electrical current to deploy the support structure to support the at least one structure.

8. The method of claim 1, further comprising storing on a computer readable storage media, by the computing device, the 3D print file with the instruction to deploy the support structure at the location to support the at least one structure by the 3D printer.

9. The method of claim 1, further comprising providing instructions to undeploy the support structure after printing the at least one structure.

10. The method of claim 1, wherein the 3D print file comprises support fabric attributes, wherein the support fabric attributes indicate one or more compatible material types of the support fabric.

11. A computer program product comprising one or more non-transitory computer readable storage media having executable instructions collectively stored on the one or more computer readable storage media, the executable instructions executable to:
send, by a three-dimensional (3D) printer, a request to a controller device to deploy a robotic support fabric at a location to support printing of at least one structure of a 3D object by the 3D printer, wherein the robotic support fabric comprises a flexible braided mesh fabric, wherein the flexible braided mesh fabric changes size and shape based on an applied electrical current;
scan with at least one sensor, by the 3D printer, at the location to support the printing the at least one structure of the 3D object by the 3D printer to verify deployment of the robotic support fabric; and
print, by the 3D printer, the 3D object over the robotic support fabric.

12. The computer program product of claim 11, wherein the executable instructions are further executable to receive a 3D print file with the instruction to request deployment of the robotic support fabric at the location for printing the at least one structure of the 3D object.

13. The computer program product of claim 11, wherein the executable instructions are further executable to receive the request to deploy the robotic support fabric at the location for printing the at least one structure of the 3D object by the 3D printer.

14. The computer program product of claim 13, wherein the executable instructions are further executable to deploy the robotic support fabric to provide support for printing the at least one structure of the 3D object by the 3D printer.

15. The computer program product of claim 11, wherein the executable instructions are further executable to determine that a bridge in the 3D object requires support and to deploy the robotic support fabric at a location requiring the support.

16. The computer program product of claim 11, wherein the executable instructions are further executable to determine that an overhang in the 3D object requires support and to deploy the robotic support fabric at a location requiring the support.

17. A system comprising:
- a three-dimensional (3D) printer having a central processor, at least one computer readable storage medium, and executable instructions stored on the at least one computer readable storage medium;
- a printer bed operably coupled to the 3D printer to support printing of a 3D print;
- a sensor operably coupled to the 3D printer to scan a location of a 3D print on the printer bed to verify deployment of the robotic support fabric;
- a support control device operably coupled to the 3D printer to deploy support at a location of the 3D print on the printer bed; and
- a robotic support fabric operably coupled to the support control device and operably coupled to the printer bed to provide support at the location of the 3D print on the printer bed, wherein the robotic support fabric comprises a flexible braided mesh fabric, wherein the flexible braided mesh fabric comprises actuating fibers configured to generate contracting and bending motions, and wherein the executable instructions are executable to:
  - receive a 3D print file with an instruction to request deployment of the robotic support fabric at the location of the 3D print requiring support;
  - scan with the sensor at the location of the 3D print requiring support to verify deployment of the robotic support fabric; and
  - print the 3D print over the robotic support fabric.

18. The system of claim 17, wherein the executable instructions are further executable to: send a request to a controller device to deploy the robotic support fabric at the location to support for printing at least one structure of the 3D print.

19. The system of claim 17, wherein the support control device comprises a robotic fabric controller operably coupled to the robotic support fabric to send a signal to change a shape of the robotic support fabric.

\* \* \* \* \*